Nov. 30, 1965    F. J. LUKETA    3,220,136
TRAWL NET PANEL CONSTRUCTION
Filed Jan. 24, 1963    7 Sheets-Sheet 1

Fig. 1.

INVENTOR.
FRANK J. LUKETA
BY
Reynolds + Christensen
ATTORNEYS

Nov. 30, 1965    F. J. LUKETA    3,220,136
TRAWL NET PANEL CONSTRUCTION
Filed Jan. 24, 1963    7 Sheets-Sheet 3

Fig. 3.

INVENTOR.
FRANK J. LUKETA
BY
Reynolds + Christensen
ATTORNEYS

Nov. 30, 1965  F. J. LUKETA  3,220,136
TRAWL NET PANEL CONSTRUCTION
Filed Jan. 24, 1963  7 Sheets-Sheet 4

Fig. 4.

INVENTOR.
FRANK J. LUKETA
BY
Reynolds Christensen
ATTORNEYS

Nov. 30, 1965   F. J. LUKETA   3,220,136
TRAWL NET PANEL CONSTRUCTION
Filed Jan. 24, 1963   7 Sheets-Sheet 7

INVENTOR.
FRANK J. LUKETA
BY
Reynolds & Christensen
ATTORNEYS

3,220,136
TRAWL NET PANEL CONSTRUCTION
Frank J. Luketa, 5567 Greenwood Ave., Seattle, Wash.
Filed Jan. 24, 1963, Ser. No. 253,649
21 Claims. (Cl. 43—9)

In my Patent No. 3,035,366, issued May 22, 1962, there is disclosed a trawl net panel assembly wherein the funnel of the net includes, at top at least, a mesh panel that is indented at its forward edge, to define an upper bosom. The forwardly extending curtains are joined by their rear edges to forwardly convergent bar-cut forward side edges of the same mesh panel of the top that is indented across its forward edge. The length of such forward side edges was restricted, as a practical matter, by the necessary width and forwardly flared shape of the indentation, with the result that the height of the curtains was correspondingly limited, as also was the height and capacity of the trawl net.

The indentation was conceived, at least in part, as a means of equalizing the tension throughout the mesh of the funnel, and particularly in its lower part, of the pull of curtain lines and sweep lines extending forwardly from the points at the termini of the upper and lower bosoms, which cause bosom lines across the indentations to assume approximately a catenary curvature that approaches the forwardly flared conformation of the indentation. The indentations were used for such a purpose in relatively small trawl nets, wherein all drag is transmitted from the lines to the net through the mesh of the funnel.

A later form of the net, intended for handling much larger catches, relieves the funnel mesh of the pull of the sweep-lines, concentrating all such drag in two strong mesh suspenders (e.g. such as they are shown in my Patent No. 3,136,085, entitled Suspension For Trawl Net Panels and Chafing Gear), that are distributed at their after ends about the open forward end of the codend, to which their mesh is connected, and which converge all their meshes forwardly to a single point, one at each side, whereto the sweep lines are connected. Longitudinally the suspenders are joined to side edges of the top and bottom of, and complete the round of the funnel. Thereby the mesh of the funnel may be of smaller twine, its meshes are more widely open, and the ultimate results are a lessening of drag, and the strengthening of the net, enabling it to handle a larger catch. Moreover, in such later form while the indentation at the top forward panel of the funnel persists, the mesh of the lower forward panel of the funnel is cut transversely by a straight point cut, and a suspension sheet or bar of a particular type (e.g. as also shown in said Patent No. 3,136,085) is joined to and extends forwardly from such point-cut forward edge of the lower mesh panel, and the sweep lines connect to the ends of the suspension sheet, or bar, as well as to the respective suspenders, to transmit drag to the net. Nevertheless, the continuing indentation at the forward edge of the upper funnel panel still acts to limit the height of the curtains and of the net.

A net panel lay-out of a form intermediate that of said patent and said application, including shorter suspenders but not the suspension sheet nor the relation of the latter to the sweep lines, is disclosed in my U.S. Patent No. 3,087,271, issued April 30, 1963, and entitled High Capacity Midwater Trawl Net Panel Layout. This patent also shows the indented forward edge of the funnel's top and bottom panels, respectively, which imposes the same limitations.

The nets to which reference has been made above have been primarily bottom trawl nets. Midwater trawl nets are of somewhat different design, and the forward bosom (upper and lower alike) of these can to advantage be bar-cut rather than point-cut. Still the indented shape of the mesh panels has persisted, since the bosoms tend to assume a catenary curvature in use. The side edges of the indentations, at each side of the bar-cut transverse edge, are in such a case point-cut.

Regardles of the type of net, the short length of the side edges of the indentations, whether bar-cut or point-cut, is disadvantageous for two reasons, at least. For one, they allow but a short length for attachment of the lines by which the net's funnel is dragged forwardly, and this may initiate tears in the netting if the strain becomes excessive; for another, they correspondingly limit the height of the curtains and of the net, hence the capacity of the net. It has been found possible to reinforce the mesh panel, thereby enabling it to sustain heavier loads and to be made larger, and so to avoid the indented form; a structure to such end is shown in my application entitled Reinforcement for the Upper Bosom of a Trawl Net, Serial No. 252,193, filed January 3, 1963.

In addition to the objections already noted, the cutting of such an indented forward edge of the funnel's top or bottom requires meticulous care. In the bottom trawl net cuts must be made along mesh bars to a precise distance to provide the bar-cut side edges of precise and equal length, and then to cut across points an exact distance to provide the point-cut transverse forward edge, correctly centered and distributed with relation to the bar-cut side edges of the indentation, and to the bar-cut outer side edges to which the curtains are laced. In the mid-water trawl net the problem is the same, although it is the side edges of the indentation that must be point-cut precisely, and the transverse forward edge that is bar-cut. One object of this invention is to simplify the lay-out and cutting of the top and bottom panels of the funnel, and more particularly, in either form, to cut their forward edges transversely by a substantially straight cut from one side edge to the other, whether this straight cut be a point-cut, as in the usual bottom trawl net, or a bar-cut as in the usual midwater trawl net, and so to leave outside edges at the sides of the panel of wholly adequate length, suitable for attachment of curtains of whatever height desired, for a full-height net.

The curtains of such nets are suspended from curtain lines which connect to the ends of the upper bosom of the funnel, and which lines are usually joined by a bosom line that is secured along the transverse forward edge of the mesh, and extends transversely between the points of connection of the curtain lines. The lower edges of the curtains of bottom trawl nets hang free, to sweep the bottom, although at their after ends the curtains are joined to the side edges of the funnel intermediate the ends of the upper and lower bosoms. Although the sweep lines, and not the curtain lines, are primarily depended upon to drag forwardly the bottom trawl net, and especially the codend and its load, a sweep line may part, and in any event it is still necessary to tension the funnel's mesh by pulling it forwardly through tension upon the curtain lines. In the midwater trawl net the upper and lower edges of the curtains are secured to curtain lines, and all such lines act as sweep lines to drag the net forwardly. The curtains are joined to the funnel along the curtain's rear edge, as before. Another object of this invention is to lay out the top of the funnel, especially in a bottom trawl net, so that it extends forwardly of the bottom of the funnel, to provide an overhang; so that it has a forward edge of shorter extent than the forward edge of the bottom, although the wider forward edge of the bottom allows it to be gathered laterally for increased strength; to resist the greater drag of the sweep lines; and so that it has bar-cut outer forward side edges that in the flat converge forwardly and in use are of the correct length for joining to the rear end of the respective curtains. Similar objects, modified as may be required by the specific differences between midwater and bottom trawl nets, are equally applicable to this invention as incorporated in midwater trawl nets.

Because the later construction of the net employs mesh suspenders of a length and mesh orientation such that when subjected to the drag of the codend they will elongate, and have their forward ends, where the sweep lines connect to them, in the vicinity of the opposite ends of the lower bosom, at least in a bottom trawl net, so that the sweep lines in effect can be connected to such lower bosom, or to the suspension sheet that extends forwardly from the bottom of the funnel, it is an object to relate the forms and sizes of the several mesh panels to the end of enabling such an assembly, all with mesh panels that are of simple pattern to cut and assemble.

Further objects will appear as this specification proceeds.

This invention concerns primarily the panel lay-out of the funnel, and the assembly thereof with relation to the suspenders, curtains, lines, suspension sheet, if used, and the remainder of the net all as shown herein in a preferred form and arrangement and in modified forms adapted to different conditions, all as described and claimed hereinafter. It is shown, and will be described, as embodied both in a bottom trawl net of large capacity, and in a midwater trawl net, but no restriction is intended by either such reference, for in certain respects the principles of this invention can equally well be incorporated in a bottom trawl net of ordinary capacity.

Figure 1:
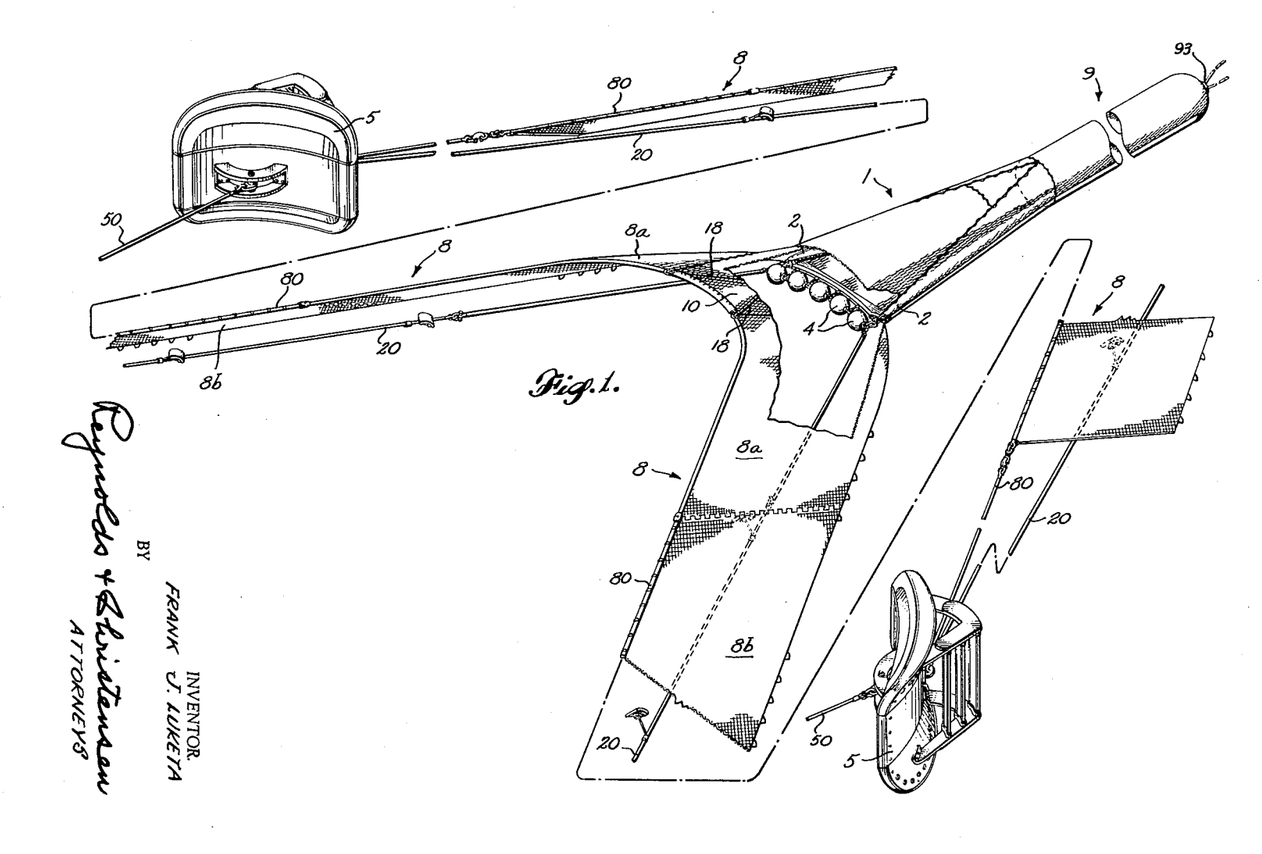
FIGURE 1 is an isometric view, partly broken away, of a bottom trawl net incorporating the present invention.
Figure 3:
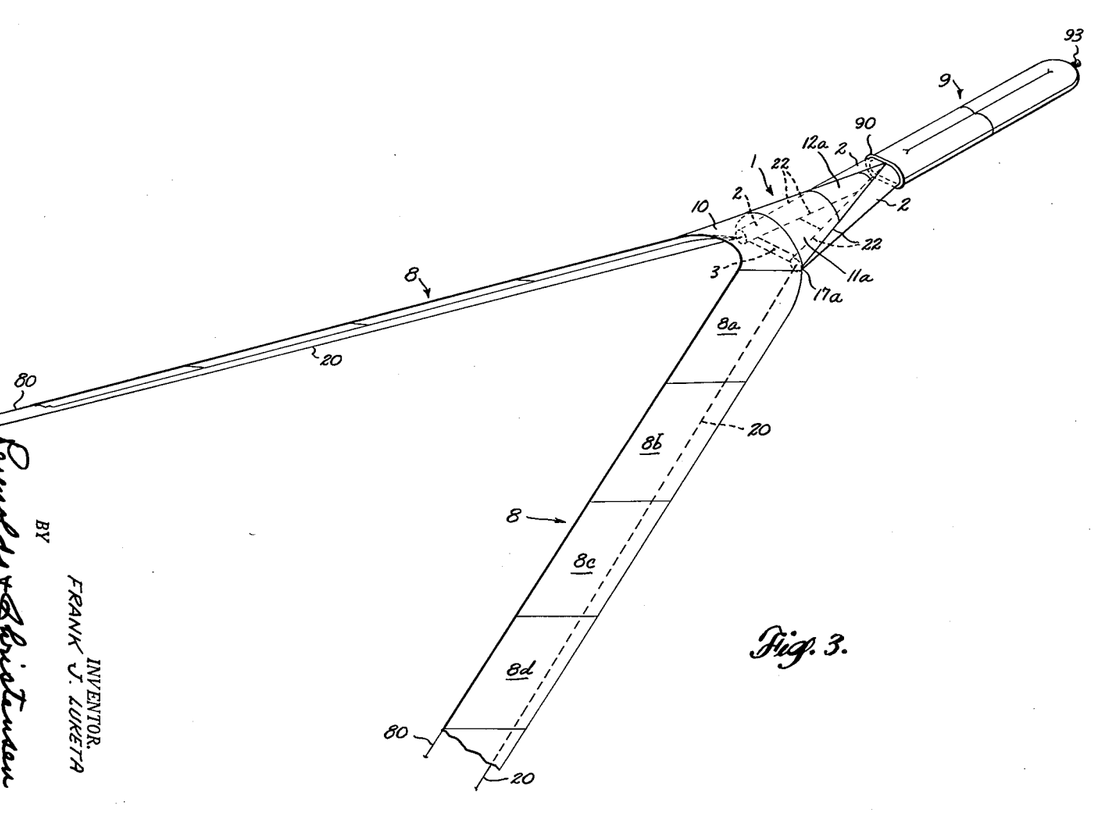
FIGURE 3 is a similar view with the mesh components assembled and the sweep lines and curtain lines symbolically attached.

Referring first to FIGURES 1 and 3, which illustrate a bottom trawl net, the net includes a codend 9, a funnel 1 surrounding the entrance to the codend and diverging forwardly therefrom, which should be of adequate height, and curtains 8 which extend forwardly from the funnel and diverge forwardly therefrom. All these components are of mesh. Curtain lines 80 along the upper edge of the curtains suspend the latter, so that (in a bottom trawl net) their weighted lower edges sweep the ocean bottom, and since these curtain lines are secured at their after ends to the upper forward edge at the ends of the bosom of the funnel, they tend to tension the funnel somewhat, as they draw it forwardly. The principal drag of the codend and its load, however, is assumed by sweep lines 20, which extend forwardly from the concentrated forward ends of two suspenders 2 that are in effect part of the funnel 1, being located at each side thereof. These suspenders have their meshes oriented with the straight-twine direction fore and aft and are joined at their after ends to the forward end of the codend 9, and along lengthwise seams 22 (FIGURE 3) to the funnel 1. The curtain lines 80 and sweep lines 20 at each side connect to the respective doors 5, which, being dragged by towing warps 50, serve to spread the curtains 8 and to drag the net proper forwardly over the bottom. Reference is made to my aforementioned application Serial No. 178,902 for a more detailed showing of the suspenders and of their relation to the codend, or to the expander ring 90 to which the suspenders and the codend are joined.

Figure 2:
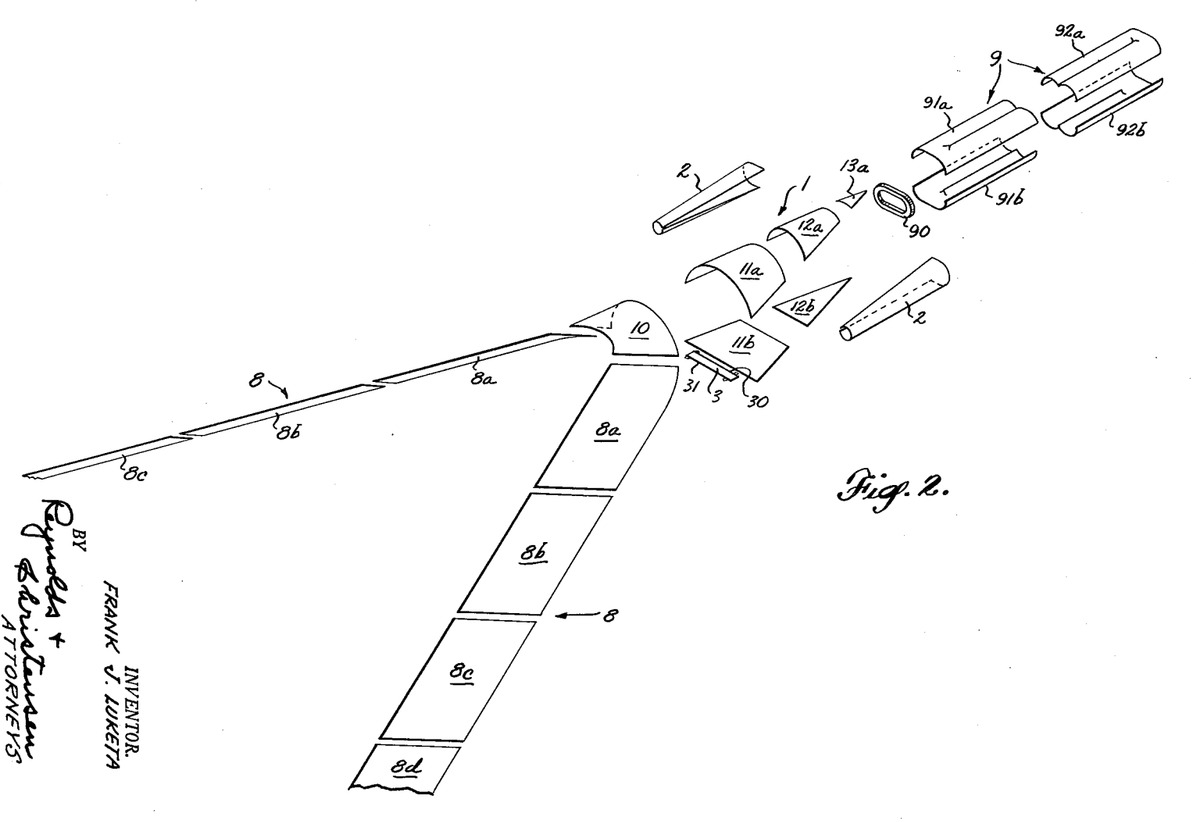
FIGURE 2 is an isometric exploded view of such a trawl net made according to this invention, with individual components in the form and relation they would assume in use.

In somewhat greater detail, the codend may be assembled from mesh panels, of large twine size, indicated at 91a and 92a (FIGURES 2 and 3) at the top, and 91b and 92b at the bottom, joined by weaving along their side edges and pursed at 93, during use, at the after end. The meshes of the codend panels are all oriented so that the straight-twine direction is fore and aft, and they elongate under the stress of a load of fish.

The funnel 1 is a composite of several shapes and sizes of panels, and of two distinct components, plus a suspension sheet or bar. Primarily it consists of a top and a bottom, each of which, in a net of the capacity intended, is of a size that it is not practicable to cut it from a single commercial width of netting; it is best made up of several woven-together mesh panels of smaller twine size than the codend, all oriented with the straight-twine direction fore-and-aft, and of two suspenders 2 at the respective sides, each of large twine size, and also oriented with the straight-twine direction fore-and-aft, so that the suspenders will elongate in use with meshes somewhat closed because of load stress as shown at 2' in FIGURE 4. These suspenders are shown each as a single panel, with double selvage edges at front and at rear, but could be made up by joining smaller individual panels. At its after end each suspender is distributed about and joined to one-half of the forward end of the codend, or to the expander ring 90 that defines such open forward end, so that in the aggregate the two suspenders encircle the open entrance to the codend. At their forward ends their meshes are concentrated at points of connection, where the sweep lines 20 are connected.

The top and the bottom of the funnel are of like conformation in their after part, but in a bottom trawl net are of different conformation in their forward part, the top having an overhang that extends ahead of the forward edge of the bottom. They are conveniently assembled of several individual mesh panels joined together, as the panels 10, 11a, 12a and 13a constituting the top, and 11b and 12b constituting the bottom, together with the suspension sheet or bar 3. The panel 10 forms the overhang.

Figure 4:
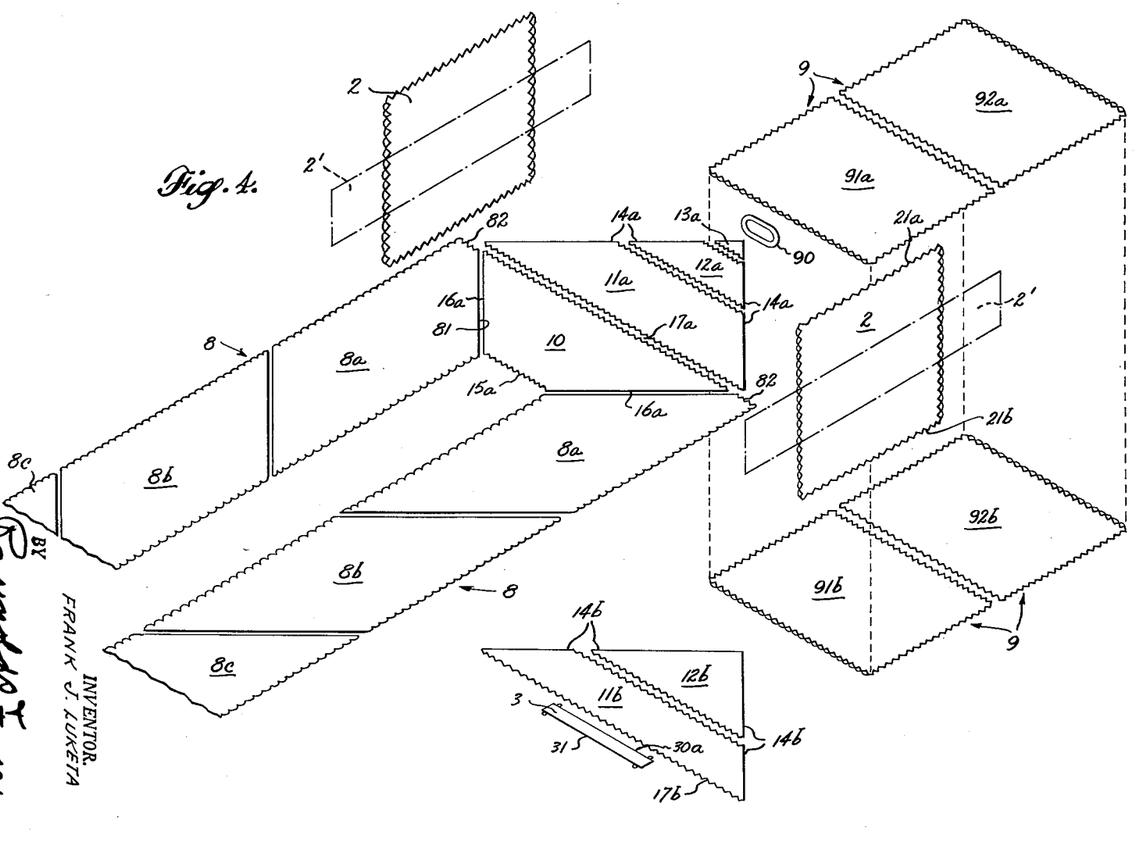
FIGURE 4 is an isometric view of the top and bottom panel lay-outs, with adjacent components of the net, each component being shown flat, and separate from other components, and drawn to a larger scale than in the preceding figures.
Figures 5, 6:
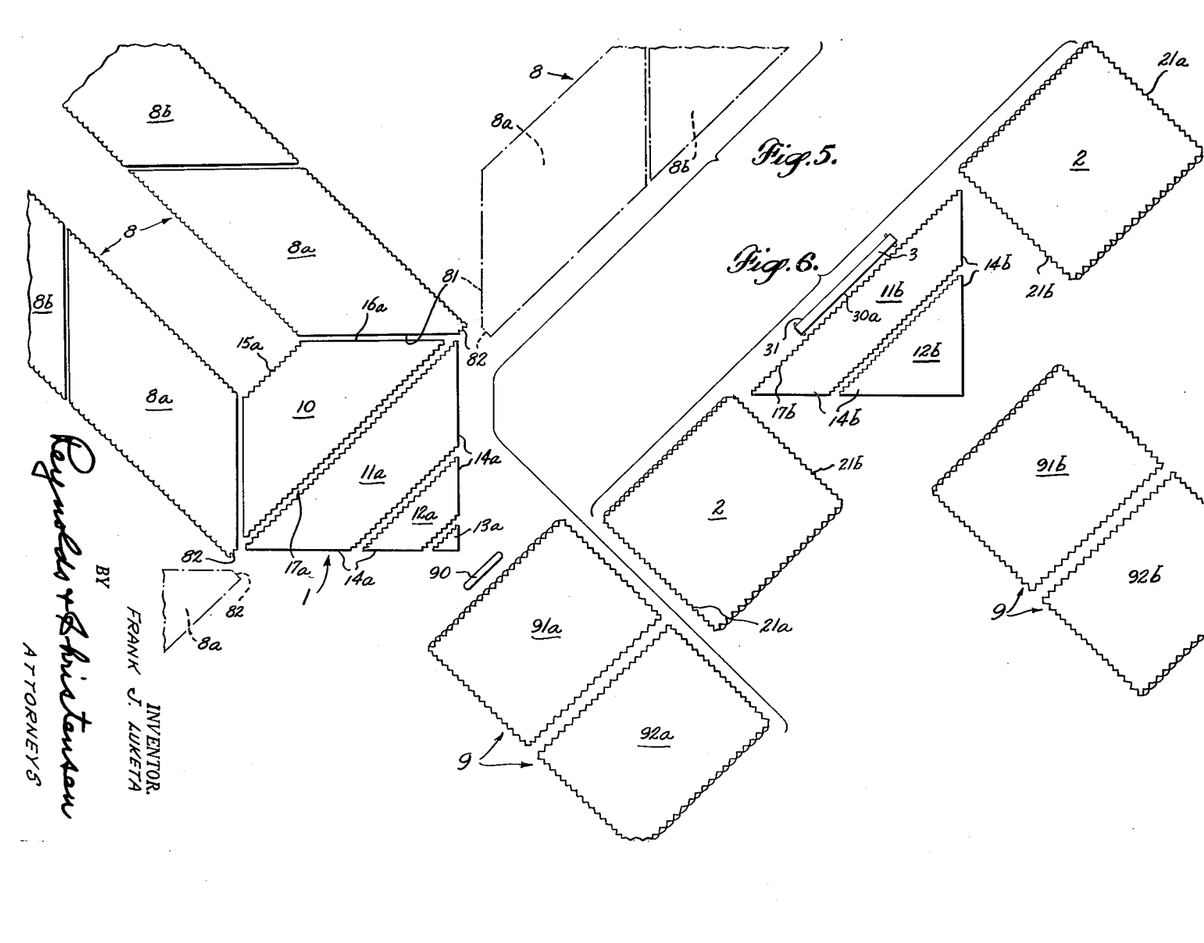
FIGURE 5 is a plan view of the lay-out of the several components that constitute or are primarily associated with the top of the net.
FIGURE 6 is a similar view of the components of the bottom and associated parts.

Referring to FIGURES 4, 5 and 6, which illustrate bottom trawl nets, it will be seen that the top is cut along forwardly diverging edges 14a, and the bottom is cut along forwardly diverging edges. Preferably, but not necessarily, these edges are formed simply by a bar-cut. In the preferred arrangement, wherein the suspenders are a part of the funnel, these edges would meet at a point in the rear, and only at this point would the top and bottom be directly joined to the codend 9 or, to the expander ring 90, but they are indirectly joined thereto through the suspenders joined at 22, as will shortly appear. The top of the funnel has straight-cut side edges 16a which normally also are bar-cut, that converge forwardly to opposite points of intersection with the straight transverse forward edge 15a, usually point-cut, that defines the upper bosom of the net. The top is made up of a forward and a rear panel 10 and 11a, at least, woven together along the transverse line 17a between the points of intersection of the forwardly divergent side edges 14a and the forwardly convergent side edges 16a. Panels 12a and 13a, one or both, may be used aft of the panel 11a, to complete the top of generally diamond shape, truncated at edge 15a. The bottom of the funnel being shorter in length than the top, terminates at the transverse straight edge 17b, also preferably point-cut, joining the forward ends of the forwardly divergent bar-cut side edges 14b, to define a generally triangular bottom. At 30a suspension sheet 3, of substantially inelastic material is joined to the laterally gathered forward edge 17b of the panel 11b to define the lower bosom at 31. The edge 17b is usually gathered and joined to the suspension sheet 3 in the manner explained in my aforementioned application Serial No. 178,902, and the sweep lines 20 are connected to the opposite ends of the suspension sheet 3. Because of the convergence forwardly of the side edges 16a from the line, at 17a, where the top is of greatest width, the forward edge at 15a is of considerably less length than the line 17a, hence of less length than the forward edge at 17b, which line 17b is at the line where the bottom panel is of greatest width. The lateral contraction of the bottom at 17b makes the two bosoms of approximately equal length, and hence the edges 16a are generally upright, although slanted fore-and-aft.

When the net is fully distended the forward edge 17b of the bottom panel 11b, extending between the outer forward extremities of said bottom panel 11b, is substantially equal in width with the top panel 11a between the same extremities. As will be readily apparent to those skilled in the fishing art, the term "fully distended" is used herein to describe that condition of the net when the individual meshes are square in shape.

Figure 11:
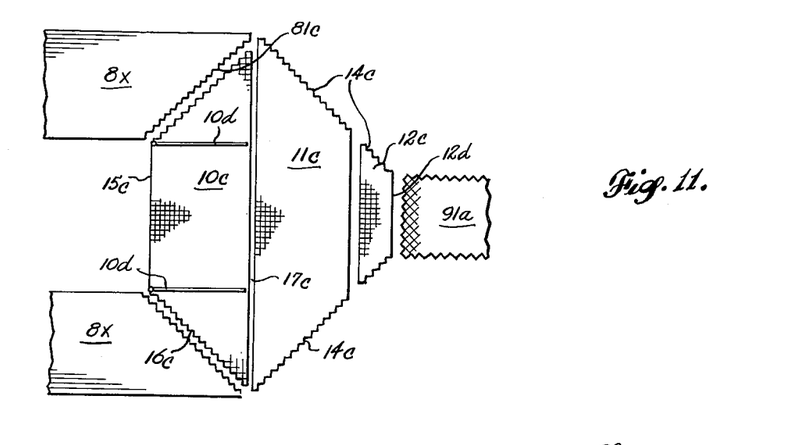
FIGURE 11 is a plan view of the individual upper panels of the funnel and the curtains, the funnel panel being bar-cut across its forward edge, and the curtains having their meshes differently oriented, as would be suitable in a midwater trawl net.

Indeed, if similar principles are incorporated in a midwater trawl net, the mesh orientation would normally be different from that described heretofore, which would revise the type of cut at specific locations. FIGURE 11 shows such changes. In such figure, the top of the funnel has been selected by way of example to show the construction of both the top and bottom of the funnel for a midwater net. In a midwater trawl net it is desirable that the funnel meshes be so oriented that they do not tend to close laterally when drawn forwardly, but rather that they tend to remain widely open, both to minimize drag and to keep the funnel open as widely as possible to sweep a large area. This orientation has the bars running fore-and-aft, and directly transversely, as FIGURE 11 illustrates. The transverse forward edge 15c of the top's forward panel 10c (as also its edge at 17c, where it joins the middle panel 11c, and the corresponding transverse edges of the after panel 12c) is bar-cut. The bottom of the funnel is not separately shown but its meshes would be similarly oriented and cut, as previously mentioned. The forwardly divergent side edges 14c, and the forwardly convergent side edges 16c, would in this case be point-cut, assuming that the suspenders are to be incorporated in the same manner as before.

The curtains 8x (FIGURE 11) need not be as open of mesh as in a bottom trawl net, and since they are secured along their after edge 81c to the point-cut edges 16c of the top, the curtains have their upper and lower edges bar-cut, and their edge 81c point-cut, and woven to the respective edges 16c.

The transverse after edge 12d of the top is bar-cut, but can be laced to the point-cut forward edge of the codend, of equal length, without difficulty.

Thus, since this invention can equally well be incorporated in either a bottom trawl net or a midwater trawl net, it only requires orientation of the meshes in the manner best suited to the type of net desired, and the type of edge cuts will depend principally upon such orientation, yet in either type adequate height of the net, the particularly of its funnel governed by the length of the edges 16a, or twice 16c in a midwater net, can be obtained by the application of the principles of this invention.

Figure 10:
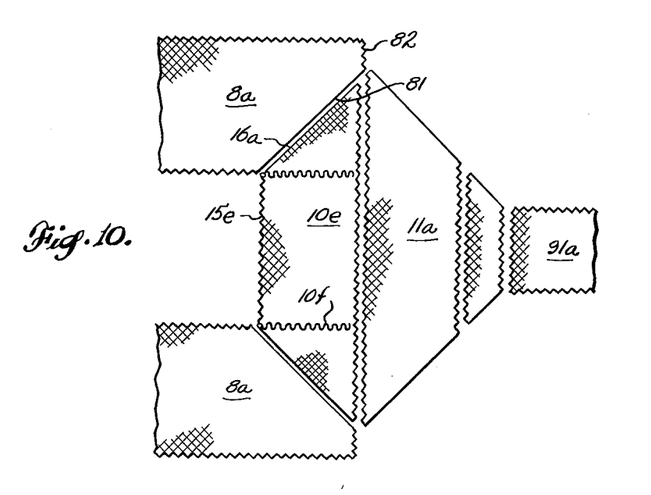
FIGURE 10 is a plan view of the individual upper panels of the funnel and the curtains, the funnel being reinforced in somewhat different fashion than in FIGURE 7.

In the bottom trawl net, as is well-known, the curtains 8 are joined along their rear bar-cut edges 81 to the respective forwardly convergent bar-cut side edges 16a of the top. As shown in FIGS. 4, 5 and 10, for example, the rear edges of the curtains 8 include a free point-cut extension 82, because curtains 8 are wider than the top 10. This is so that the lower edges of curtains 8 will contact the bottom and insure contact of its lower edge with the bottom, and yet to permit the point-cut lower edge of the curtain to trail aft of the respective upper edges.

Since the edge 15a of the top defines the upper bosom, and the edge 31 of the suspension sheet 3, to the rear edge 30 of which the bottom's edge 17b is joined, defines the lower bosom, it will be clear that the edges 16a between the termini of edges 15a and 17b are generally upright in use, and their length limits or defines the height of the funnel and the height of the curtains. The larger in area is the top and the bottom, the longer are the edges 16a, and the higher are the funnel and the curtains. The shape and relationship of the top and bottom panels, cut according to this invention, place no restrictions upon these heights, and frees the curtains of the height restriction imposed by the length of the bar-cut side edges of the indentations in the earlier panel lay-outs, for in the latter the curtain height was limited by the length of these side edges of the indentations, as has been explained above.

Figures 7, 8, 9:
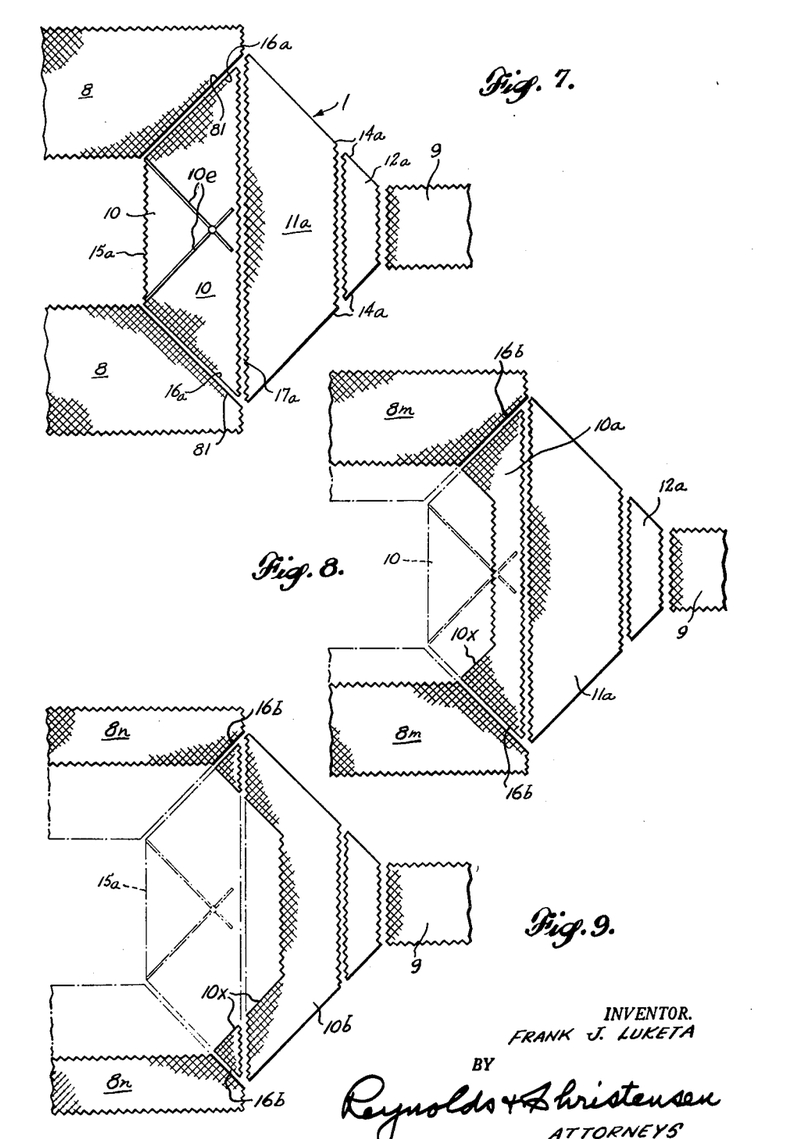
FIGURE 7 is a plan view of the individual upper panels of the funnel, and associated curtains, with reinforcement such as makes this lay-out practical.
FIGURES 8 and 9 are similar views of the older indented panel lay-outs, showing their deficiency in strength, lacking adequate reinforcement.

Thus, as FIGURES 8 and 9, in comparison to FIGURE 7, will show, the panels aft of the greatest breadth of both top and bottom are of the same basic size, but the panel 10a or 10b, because of the indentations at 10x, leaves only a short line at 16b, and this limits the height of curtains 8m or 8n, and of the net funnel itself.

The suspenders may not be required, especially in smaller sizes of the net, for the mesh of the funnel, oriented with the straight-twine direction fore-and-aft, may then be adequately strong to assume the drag of the codend. If suspenders are omitted the side edges 14a and 14b may be joined directly by lacing, or by an interposed gusset, instead of by the suspenders. If the suspenders were omitted the after ends of the panels constituting the after portions of the top and the bottom would be cut straight across, rather than converging to a point, as in FIGURES 10 and 11, for the top and the bottom would then join directly to the codend or about the open forward end thereof, rather than joining the same only at a point, as shown in other figures, and joining primarily through the intermediary of the suspenders.

Also, while the side edges of the top and of the bottom, at 14a, 16a, and 14b, have been described as bar-cut in the bottom trawl net, if it were desired to afford greater forward flare to the funnel, these side edges, or at least the edges 14a and 14b, would be taper-cut.

It might in some cases be desirable to graduate the pull of the curtain lines, in particular, on the mesh of the top, or in the case of a midwater trawl net, on the mesh of the bottom also. A taper cut would produce such a result, hence while the edges 15a (and 17b) have been described as point-cut, and straight, a departure therefrom by the use of a gradual taper cut, both ways from the middle, is still within the intent of the invention, although the point-cut edge at 15a is much preferred.

The lower forward edge at 17b has been described as extending as far forwardly as the line 17a, but it may be desired to stop this forward edge, the base line of the generally triangular bottom, somewhat short, since the bottom is completed by the suspension sheet 3, or it may be desired to extend the bottom somewhat forwardly. Exact correspondence in length of the bottom and of the after half of the top is not an essential element of the invention.

Thus, while the preferred arrangement, in a bottom trawl net, is that shown and first described, the principles of the invention can be adapted to different conditions and usages, by departure in the ways just indicated from the precise forms and arrangements that are described herein as preferred.

Curtains 8 are normally made up of panels 8a, 8b, 8c, etc., which are bar-cut along their forward and their rear edges. These edges extend diagonally relative to their point-cut or selvage edges along the top and the bottom of the curtains. The rearmost curtain panel 8a, 8m, or 8n at each side has its bar-cut rear edge 81 of a length substantially equal to the length of the bar-cut side edge 16a of the top, although it has some excess length at 82, for the purpose indicated above. The edges 16a and 81 are joined, in the assembled net, as are the adjoining edges of successive panels 8a, 8b, 8c, etc. to make up the complete curtains 8 of indeterminate length, extending forwardly from and joined to the respective side edges 16a of the funnel, as has already been described. The excess length at 82 allows the lower edge of the curtain, close to the funnel, to reach and sweep the bottom as it is drawn through the water as the other parts of the lower edges of the curtains do.

The net is assembled from the several panels and components described by joining the longitudinal side edges of codend panels 91a, 92a of the top to like edges of panels 91a, 91b of the bottom, the forward edge of the codend being joined about the expander ring 90. The several panels 10, 11a, 12a and 13a of the top of the funnel are joined by lacing or weaving as are the panels 11b and 12b of the bottom. The suspenders 2 are joined about their after edges to the expander ring 90, and their longitudinal side edges 21a and 21b are stretched and may be joined adjacent their forward ends, but the after portion of each suspender is joined to the side edges 14a and 14b of the top and bottom, respectively, which when stretched they are at least equal in length. The suspenders might be of a length to extend appreciably ahead of forward edge 17b that defines the lower entrance to the funnel, but preferably each suspender, when stretched, terminates at a forward point in the vicinity of line 17b. A suspension sheet or bar 3, of substantially inelastic but wear-resistant material, straight across its rear edge 30 to match edge 17b when gathered, and if desired curved across its forward edge 31, is joined at its straight rear edge 30 to the straight but laterally gathered forward point-cut edge 17b (the manner of joining them may be such as is described in my aforementioned application Serial No. 178,902), both being, in that condition, of substantially the same length, and the forward edge 31 of the suspension sheet then becomes the lower bosom of the net, and is joined at its ends to the rear ends of the sweep lines 20, that connect to the adjacent forward ends of the suspenders. The drag of the net other than the curtains is thereby assumed by the sweep lines, through the suspenders, and the tension applied to the funnel through the suspension sheet 3 and the curtain lines 80 is only sufficient to maintain the funnel distended, both laterally and vertically, the latter in conjunction with the pull of the curtain lines 80. The suspension might be such as is described in my companion application Serial No. 249,265 filed January 17, 1963, and entitled Lower Bosom Suspension for Trawl Nets. Bobbins 4, suspended across the lower bosom and rolling over the bottom, facilitate advance of the net.

While the reinforcement shown at 10e in FIGURE 7 is the subject of a companion application, alternative types of reinforcement applicable to the alternative mesh orientation of the midwater trawl net, or to a bottom trawl net of lesser capacity, lacking the suspenders, are shown respectively in FIGURES 11 and 10. With the mesh orientation of FIGURE 11 the pull of curtain lines 80 is concentrated at the ends of the bar-cut forward edge 15c. To avoid overstressing of the mesh, and a possible tear, a reinforcing line 10d is secured, along the bar that leads to the respective ends of edge 15c, at frequent intervals to the mesh of panel 10c. In FIGURE 10 the forward edge 15c of panel 10e is point-cut, but the net is designed to be of small capacity, for shrimp for example, and the mesh will not be heavily stressed, yet there should be a limit to the stress applied to the to the mesh. The reinforcing lines 10f extend directly aft from the ends of edge 15c, where the curtain lines are attached, but are sinuous. They do not interfere with elongation of the mesh of 10e until its stress limit is approached, when they become straight and assist the mesh in sustaining the load.

It will be noted that every edge of every panel or mesh component is substantially straight, not indented, in the preferred form, and that the straight cuts by which they are preferably cut from commercial netting is either a point-cut or a bar-cut—none need be a tapered cut nor partly bar-cut and partly point-cut—which are rather easy to make and to measure precisely. All this makes the laying out and the joining of the various components a simple job, and if replacement of a panel becomes necessary it can be done in a minimum of time and with a minimum of labor, and without waste of material, such as occurred when using indented panels.

From the foregoing, further variations, adaptations, modifications and characteristic features can be evolved by those skilled in the art to which the invention is addressed, within the scope of the following claims.

I claim as my invention:

1. A trawl net funnel comprising a top and a bottom of mesh, each having forwardly divergent side edges, at least one of said top and bottom of mesh having side edges which extend convergently forwardly from the outer forward extremities of its forwardly divergent side edges, and also having a forward edge extending transversely between the forward extremities of its forwardly convergent side edges, to define a bosom of the funnel, the other of said bottom and top of mesh having a forward edge extending transversely between its side edges, and means joining the forwardly divergent side edges of the top and bottom, to complete the round of the funnel.

2. A trawl net funnel comprising a top and a bottom of mesh each oriented to dispose the points of its meshes in transverse alignment, and each having forwardly divergent side edges, the top also having side edges which converge forwardly from the outer forward extremities of the forwardly divergent side edges, said top having a forward edge extending transversely between the forward extremities of its forwardly convergent side edges, to define the upper bosom, the bottom having a forward edge extending transversely between the forward extremities of its side edges, and means joining the forwardly divergent side edges of the top and bottom, to complete the round of the funnel.

3. A trawl net funnel as in claim 2, wherein the means joining the forwardly divergent side edges of the top and bottom comprise suspenders of mesh oriented with the straight-twine direction fore and aft, and each extending from its rear end, where the meshes are distributed for connection to the net's codend, to a single point of connection at its forward end.

4. A trawl net funnel comprising a top and a bottom of mesh each oriented to dispose the points of its meshes transversely, and each formed with forwardly divergent bar-cut side edges, means joined to the top and bottom along said side edges, to complete the round of the funnel, at least one of the top and bottom being formed with bar-cut side edges forwardly convergent from the outer forward extremities of the forwardly divergent side edges, and also having a transverse point-cut forward edge between the forward extremities of the forwardly convergent edges, to define a bosom of the net.

5. In combination with a trawl net funnel as in claim 4, curtain panels having rearwardly and downwardly sloping bar-cut rear edges, approximating the length of the said forwardly convergent edges, and joined thereto.

6. A trawl net funnel, as in claim 4, wherein the funnel's top is formed with the forwardly convergent side edges, the bottom terminating forwardly at a transverse point-cut edge joining the outer forward extremities of its forwardly divergent side edges.

7. A trawl net funnel, as in claim 6, wherein the fully distended width of the bottom between the outer forward extremities of its forwardly divergent side edges is substantially equal to the fully distended width of the top between the same extremities.

8. A trawl net funnel, as in claim 7, including additionally a substantially inextensible suspension sheet of a width less than the fully distended width of the forward edge of the bottom, the latter being laterally gathered and joined by its point-cut edge to the suspension sheet along the latter's rear edge, and the forward edge of the suspension sheet defining the lower bosom of the funnel.

9. A trawl net funnel comprising a top and a bottom of mesh, each oriented to dispose the points of its meshes transversely, the top including a mesh panel bar-cut along forwardly divergent rear side edges, and along forward side edges that converge forwardly from the outer forward extremities of the divergent rear side edges, and being point-cut transversely from one forward extremity of a forward side edge to the like extremity of the opposite forward side edge, to define the upper bosom; the bottom including also a mesh panel bar-cut along forwardly divergent side edges, and point-cut along a transverse line joining the forward outer extremities of its said side edges; and means joining said top and bottom along their respective forwardly divergent side edges, to complete the round of the funnel.

10. A trawl net funnel as in claim 9, including additionally a suspension sheet of substantially inelastic material having a straight rear edge, and joined along such rear edge to the straight point-cut forward edge of the bottom, and curved along its forward edge to define the lower bosom.

11. A trawl net funnel as in claim 10, wherein the suspension sheet is of less width than the forward edge of the bottom, the bottom being gathered laterally and distributed across the rear edge of the suspension sheet, where it is joined thereto.

12. A trawl net funnel comprising a top and a bottom of mesh each oriented to dispose the points of its meshes in transverse alignment, with the straight-twine direction fore-and-aft, both the top and the bottom comprising a rearwardly disposed, mesh portion, being of generally triangular shape, with forwardly divergent side edges, and at least one of said top and bottom also comprising a forwardly disposed mesh portion of generally triangular shape, with side edges extending convergently forwardly from the forward extremities of the rearwardly disposed mesh portion to its rear, said forwardly disposed mesh portion being truncated to omit the forward point and to leave a transverse forward edge, and means joining the forwardly divergent side edges of the top and bottom.

13. A trawl net funnel comprising a top and a bottom of mesh each oriented to dispose the points of its meshes in transverse alignment, with the straight-twine direction fore-and-aft, said top being generally of diamond shape, with forwardly divergent and then forwardly convergent side edges, but truncated at its forward corner to define a transverse forward edge, said bottom being generally of triangular shape corresponding to the rear half of the top, with forwardly divergent side edges, and oriented with the base of the triangle forwardly, and means joining said top and said bottom along their said forwardly divergent side edges.

14. A trawl net panel assembly comprising in combination with the codend and with two mesh suspenders, one at each side, distributed about and joined at their rear ends to the forward end of the codend, and each converging forwardly to a point, a funnel including a top and a bottom of mesh, each oriented to dispose its meshes in transverse alignment, the top being cut substantially straight along opposite forwardly divergent side edges, and the bottom being also cut substantially straight along opposite forwardly divergent side edges, and the top and bottom being joined along said side edges to the suspenders at the respective sides to complete the round of the funnel, the top also being cut substantially straight along opposite forwardly convergent side edges continuing forwardly from the said forwardly divergent side edges of the top, and said top being cut substantially straight across its forward edge between the forward extremities of the said forwardly convergent side edges, to define a forward bosom, and the bottom being also cut substantially straight across its forward edge between the forward extremities of its side edges.

15. A trawl net panel assembly comprising, in combination with the codend and the suspenders of the net, a funnel including a top and a bottom, each oriented to dispose the points of its meshes in transverse alignment, each of the top and bottom being point-cut transversely entirely across its forward edge, and each being bar-cut along opposite rearwardly converging side edges, and joined along said bar-cut edges to the suspenders at each to complete the funnel, the funnel being secured at its after end to the codend.

16. A trawl net panel assembly as in claim 15, including a line secured to the outer and forward extremities of the bar-cut forward edges of the top and extending forwardly for drawing the funnel forwardly, means applied to the bar-cut forward edge of the bottom for drawing the same forwardly, said lines and said means cooperating to maintain the funnel distended.

17. A trawl net panel assembly as in claim 16, including a line secured to the forward end of the suspender and extending forwardly for dragging the codend forwardly, and through the connection of the suspenders to the funnel assisting in maintaining the latter distended.

18. A trawl net panel assembly comprising in combination with panels that define the codend and the suspenders of the net, a funnel including a top and a bottom each oriented to dispose the points of its meshes in transverse alignment, each of the top and bottom being point-cut transversely entirely across its forward edge, and each being bar-cut along opposite rearwardly converging side edges, the bar-cut side edges of the bottom intersecting the point-cut forward edge thereof to define a wide lower forward edge of the funnel, the top extending forwardly of that forward edge and being additionally bar-cut along opposite forwardly converging edges, each to a point of intersection with its point-cut forward edge, whereby the point-cut forward edge of the top defines a narrow upper bosom, lines extending forwardly from the ends of and across the upper bosom, and other lines extending forwardly from the vicinity of the ends of the lower forward edge of the funnel, said lines being tensioned in use to draw the net forwardly and to hold the funnel distended.

19. A trawl net as in claim 18, including a substantially inelastic sheet the after edge whereof is straight, and joined across the entire width thereof the point-cut forward edge of the bottom, its forward edge defining the lower bosom, the lines to the lower entrance of the funnel being secured at their after ends to the respective ends of the lower bosom.

20. A trawl net funnel comprising a top and a bottom of mesh each oriented to dispose the bars of its meshes transversely, and each formed with forwardly divergent point-cut side edges, means joined to the top and bottom along said side edges to complete the round of the funnel, at least one of the top and the bottom being formed with point-cut side edges converging forwardly from the outer forward extremities of the forwardly divergent side edges, and also having a transverse bar-cut forward edge between the forward extremities of the forwardly convergent side edges, to define a bosom of the net.

21. A trawl net comprising a funnel having a top and a bottom of mesh, each of a generally diamond shape truncated at a forward point to define a bosom, means joining the top and the bottom along their rear forwardly divergent side edges, to complete the round of the funnel, and curtains of mesh connected to the said forwardly convergent side edges of the top and bottom, and extending thence forwardly.

References Cited by the Examiner

UNITED STATES PATENTS

| | | | |
|---|---|---|---|
| 2,816,386 | 12/1957 | Harris et al. | 43—9 |
| 3,035,365 | 5/1962 | Luketa | 43—9 |
| 3,035,366 | 5/1962 | Luketa | 43—9 |
| 3,087,271 | 4/1963 | Luketa | 43—9 |

ABRAHAM G. STONE, *Primary Examiner.*

F. RAY CHAPPELL, *Examiner.*